H. KEYES.
Wheel Hub.

No. 98,273.

Patented Dec. 28, 1869.

WITNESSES

INVENTOR

UNITED STATES PATENT OFFICE.

HORATIO KEYES, OF TERRE HAUTE, INDIANA.

IMPROVEMENT IN CARRIAGE-WHEELS.

Specification forming part of Letters Patent No. 98,273, dated December 28, 1869.

*To all whom it may concern:*

Be it known that I, HORATIO KEYES, of Terre Haute, in the county of Vigo and State of Indiana, have invented a new and Improved Wheel for Vehicles; and I do hereby declare that the following is a full, clear, and exact description thereof, which will enable others skilled in the art to make and use the same, reference being had to the accompanying drawings, forming part of this specification, in which—

Figure 1:
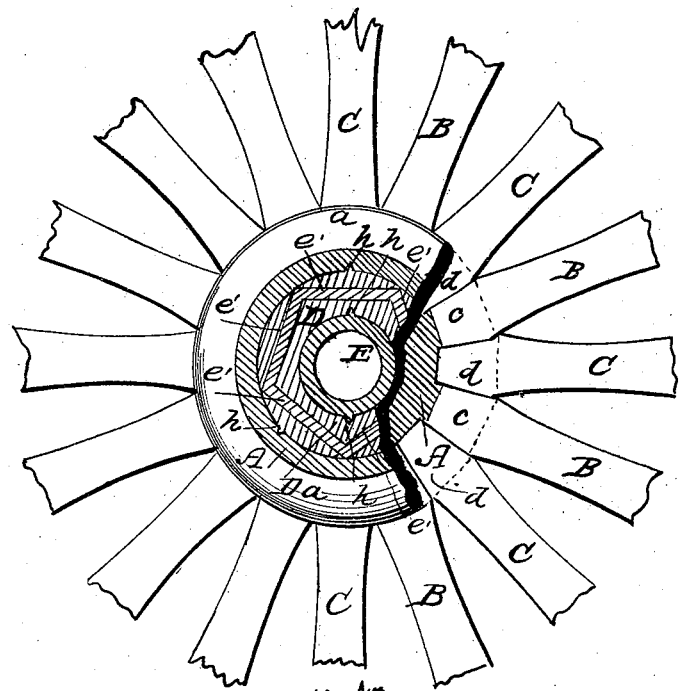
Figure 2:
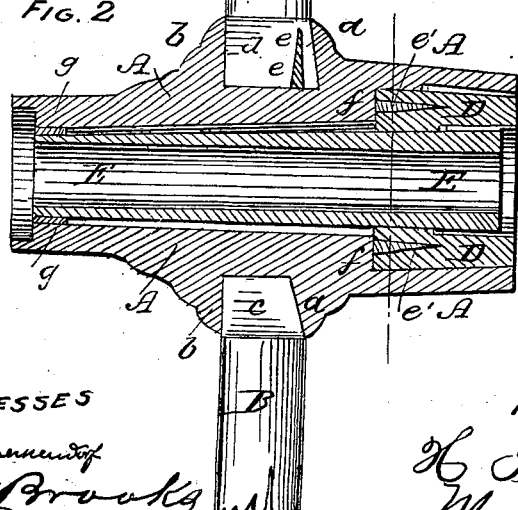

Figure 1 represents a face view, partly in section, of my improved wheel. Fig. 2 is a vertical longitudinal section of the same.

Similar letters of reference indicate corresponding parts.

This invention relates to a new manner of securing the spokes in the hub of a wheel, with an object of obtaining a firm hold, and of facilitating repair in case one or more of the spokes should be broken.

The invention relates also to a new manner of securing the box in the hub, all as hereinafter more fully described.

A in the drawing represents the metallic hub of the wheel. It has two shoulders, $a$ and $b$, formed around it, and between them a groove, into which the spokes are to be set. This groove is wider at the outer part than at its bottom to receive the wedge-shaped tenons or ends $c$ of the spokes B. The spokes B are at their lower ends so far apart that between every pair of them another spoke, C, can be put in. The wedge-shaped lower ends $d$ of these spokes C are longer than the ends $c$, and are inserted deeper into the hub, the grooves being deepened for their reception, as shown in Fig. 1. Where the groove is thus deepened for the reception of the spokes $c$ it is also widened at its inner part, so as to become wider at the bottom than at the outer part.

The spoke C, before being inserted, receives a wedge, $e$, in its lower end, and is then forced into the groove. The wedge is sharply driven into the spoke, and expands the end of the same, so that it will fill the dovetail part of the groove. Every other spoke is thus securely held by the wedge, while the others are simply fitted in place, as aforesaid. In Fig. 2, one spoke, C, is represented held by a wedge, and one, B, fitted loose. The spokes C may, however, as well be used altogether, or in different suitable numbers.

The bore of the hub is enlarged at the inner end to form a chamber, which is of tapering form—that is to say, larger diameter at the inner than it is at the outer end. This chamber is filled by a short wooden tube, D, which also receives wedges $e'$ in its inner end, which, when forced against the end $f$ of the said chamber, expand the inner end of the tube, and cause it to fill the chamber. The tube is thus also dovetailed, and cannot work out at the end. The box E is fitted through the tube D, and through the bore of the hub, and is held at its outer end by a leather or canvas ring, $g$, laid around it, the inner end fitting flush into the tube D.

Flanges or ribs $h$ on the box, fitting into grooves of the tube, prevent the box from revolving in the hub.

Having thus described my invention, I claim as new and desire to secure by Letters Patent—

1. The spokes C, dovetailed into the groove of a metallic hub by means of wedges, which expand their ends, as set forth.

2. The spokes B C of a wagon-wheel, fitted alternately secure and loose into an endless groove of a metallic hub.

3. The tube D, for holding the inner end of the box E when countersunk or dovetailed, by means of wedges, into the enlarged part of a chamber in the hub, as set forth.

4. Retaining spokes in the hub of wheels, by means of wedges forced into them, as set forth.

HORATIO KEYES.

Witnesses:
 GEO. W. MABEE,
 S. KEYES.